United States Patent [19]
Goeckner et al.

[11] Patent Number: 5,475,561
[45] Date of Patent: Dec. 12, 1995

[54] SOLENOID CIRCUIT

[75] Inventors: Victor D. Goeckner, Auburn; Ronald W. Steffen, Springfield, both of Ill.

[73] Assignee: DICKEY-John Corporation, Auburn, Ill.

[21] Appl. No.: 261,294

[22] Filed: Jun. 16, 1994

Related U.S. Application Data

[60] Continuation of Ser. No. 964,770, Oct. 22, 1992, abandoned, which is a division of Ser. No. 822,078, Jan. 17, 1992, Pat. No. 5,249,658, which is a continuation of Ser. No. 470,753, Jan. 26, 1990, Pat. No. 5,082,097, which is a continuation-in-part of Ser. No. 446,307, Dec. 5, 1989, abandoned.

[51] Int. Cl.⁶ .................................................. H01H 47/00
[52] U.S. Cl. ............................ 361/189; 361/194; 361/195
[58] Field of Search ................................. 361/139, 143, 361/160, 166, 170, 187, 189, 194, 195, 206

[56] References Cited

U.S. PATENT DOCUMENTS

| | | | |
|---|---|---|---|
| 4,620,259 | 10/1986 | Oshizawa | 361/152 |
| 4,734,817 | 3/1988 | Baker et al. | 361/190 |
| 5,082,097 | 1/1992 | Goeckner et al. | 192/32 |
| 5,159,522 | 10/1992 | Gray | 361/154 |
| 5,249,658 | 10/1993 | Goeckner et al. | 192/0.032 |

*Primary Examiner*—Jeffrey A. Gaffin
*Attorney, Agent, or Firm*—Leydig, Voit & Mayer, Ltd.

[57] ABSTRACT

A solenoid circuit for particular use in a transmission controller measures the instantaneous current through the solenoid coil with the use of a current switch operating in an on mode to cause the current in the coil to increase and an off mode to cause the current in the coil to decrease so that an average current through the coil is established.

5 Claims, 6 Drawing Sheets

FIG.2C
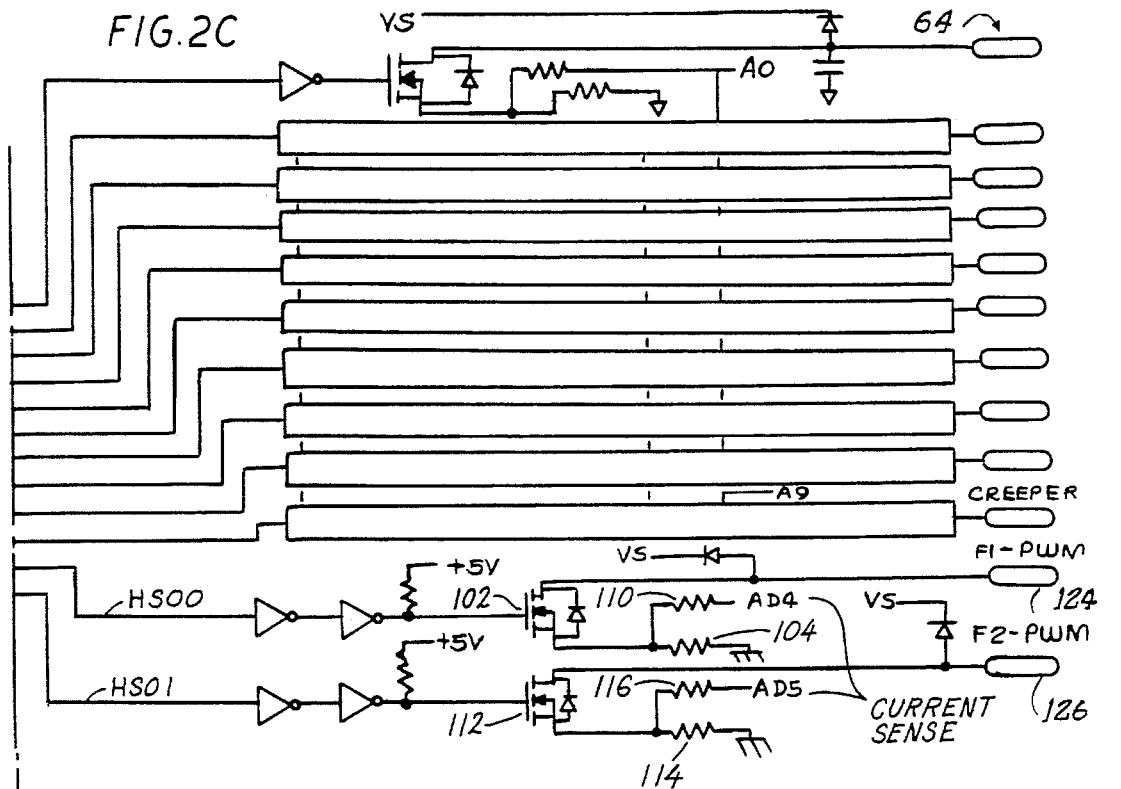
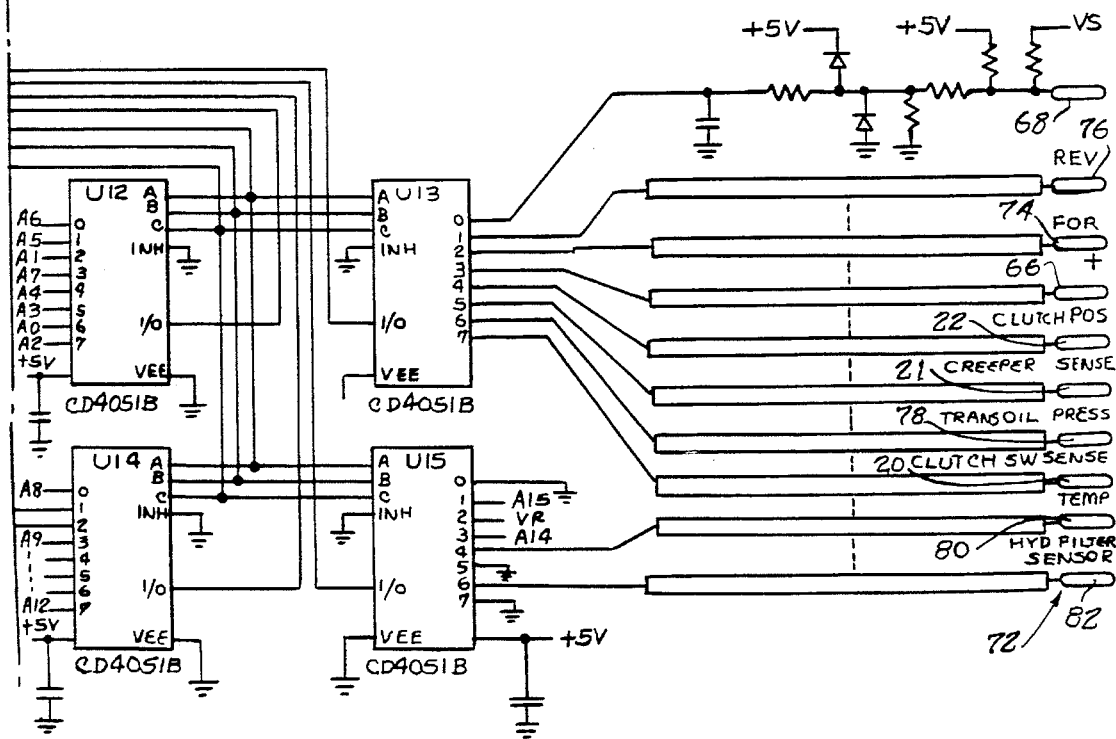

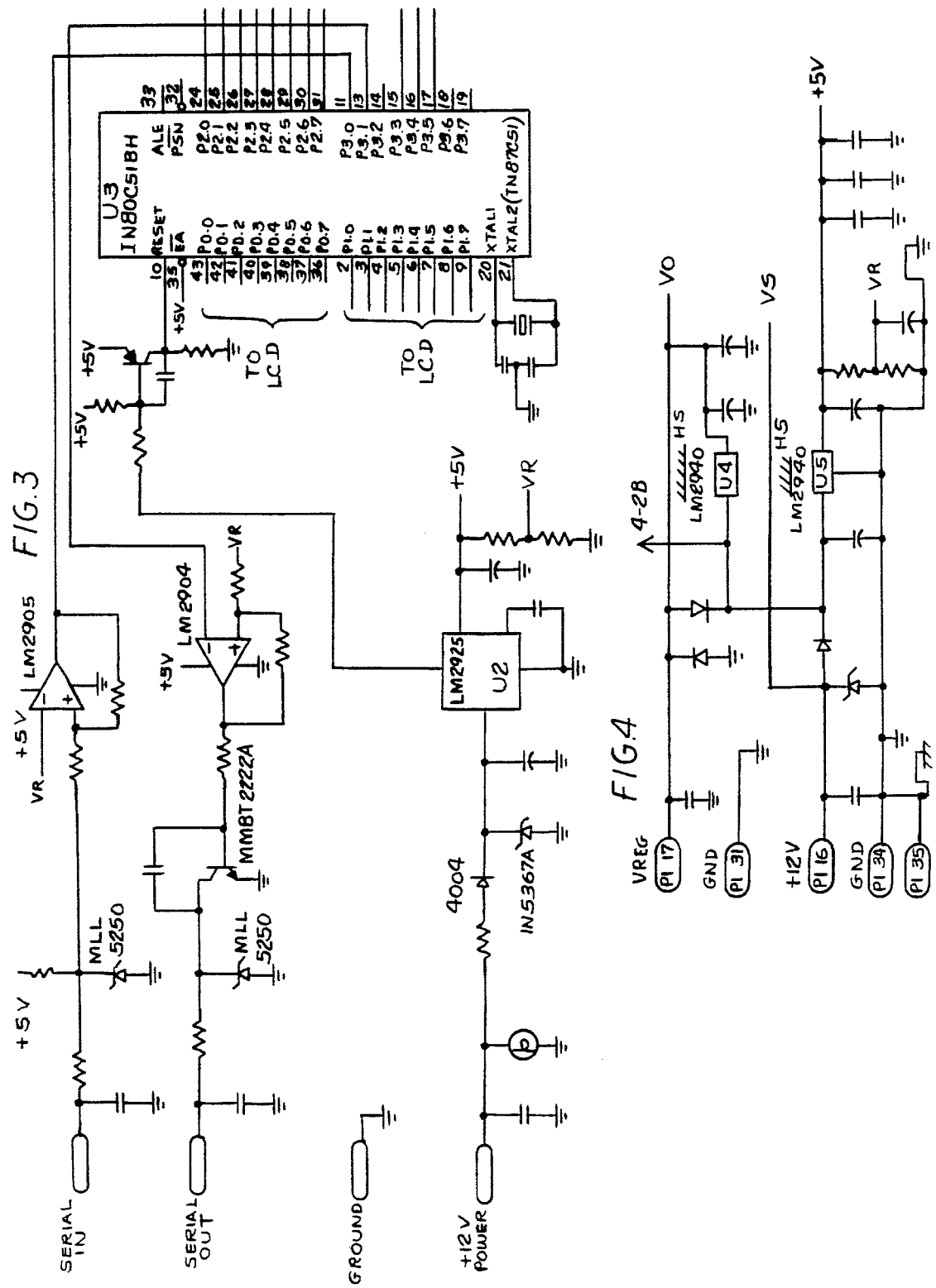

106 DESIRED CURRENT

200µS

108 NEW PSEUDO THRESHOLD

10MS $P_{ON}$

SOLENOID CIRCUIT

This is a continuation of application Ser. No. 07/964,770, filed Oct. 22, 1992, now abandoned, which is a division of application Ser. No. 07/822,078, filed Jan. 17, 1992, which is a continuation of application Ser. No. 07/470,753, filed Jan. 26, 1990, now U.S. Pat. No. 5,082,097, which is a continuation-in-part of application Ser. No. 07/446,307, filed Dec. 5, 1989, now abandoned.

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever. This material is contained in a computer program listing printout in the form of a microfiche appendix.

BACKGROUND OF THE INVENTION

This invention is directed generally to transmission controllers, and more particularly to an automated transmission control system which automatically calibrates the system for accommodating clutch starting torque for the associated transmission.

In relatively large on-the-road or off-the-road vehicles, relatively complex transmissions are required. Large heavy construction equipment, farm tractors and the like, generally employ transmissions which provide for multiple gears in both forward and reverse directions. Such multiple gearing systems commonly require multiple gear shift levers, multiple clutches, and corresponding operator controls for manual operation thereof. In addition, many such vehicles such as tractors, road construction or other construction equipment, etc., often require numerous other operator controls for controlling various accessories, such as blades, backhoes, buckets, farm implements, and the like.

Accordingly, it has been heretofore proposed to provide automated or partially automated transmission control systems for simplifying the manual operation of the vehicle transmission. Such control systems may employ solenoid operated valves which valves applly hydraulic pressure in a clutch cavity for operating the clutches of the transmission to free the operator from foot-pedal-operated or otherwise operator-actuated clutches. Such controls may also incorporate simplified shift levers which electrically or electro-hydraulically operate corresponding clutches and other mechanical components for engaging the desired gears without cumbersome manual operation of large heavy gear shift levers or the like by the operator.

Such control systems require relatively sophisticated electronic control arrangements for properly integrating the disengagement and reengagement of clutches and the selection of gears in the proper sequence and with the proper timing to assure smooth shifting of the transmission through both forward and reverse gears, and also from forward to reverse gears or vice versa, as may be desired in operation. It should be noted in this regard that such shifting is not always between adjacent gears. Operating conditions may require shifts from neutral which "skip over" a number of gears, or even shifts from a high forward gear to a reverse gear or vice versa.

One problem that has heretofore arisen in such transmissions is the problem of obtaining a smooth transmission operation during various vehicle operations. Such operations include starting the vehicle moving from a standstill, any forward to reverse shifting (or vice versa), certain gear shifts, and so-called feathering operations and/or inclining operations. Certain gear shifts sometimes occur between two gears which require engagement and disengagement of multiple clutches. In order to smoothly shift between two gears which are employed using multiple clutches, it is important that the clutches be smoothly disengaged and engaged in synchronization to maintain a controlled clutch slippage for smooth shifting between the gears. The same sort of controlled slippage of clutches is also required in so-called feathering and inching operations, and during start up/slow down and/or directional changes. This requires that the controller be properly calibrated to, in effect, "feel" the engagement and disengagement of the respective clutches to insure a smooth transmission operation in the foregoing types of operations.

In our novel system, we use solenoid-actuated proportional valve-operated clutches. We have found that it is necessary that the solenoids be provided with controlled operating currents to assure proper operation of the proportional valves to obtain a smooth and synchronized engagement and disengagement of respective clutches during those types of operations in which controlled clutch slippage is required.

Heretofore it has been proposed to calibrate the proportional valves by manually adjusting the valves to obtain a given pressure when a known or given current is being applied to the associated solenoid. For example, a predetermined threshold current was applied to the solenoid while the corresponding proportional valve was adjusted to achieve a nominal operating clutch pressure of 50 psi. The desired result of this operation is to achieve a clutch pressure at which the clutch will just begin to carry torque and engage or disengage the related gears at a known applied current, so that this current may be repeated to facilitate simultaneous engagement and/or disengagement of the clutch when necessary.

However, the 50 psi figure was at best an approximation, given the tolerances found in the solenoid valves themselves as well as related hydraulic and mechanical components of the clutching system. It has been found, for example, that some clutches will tend to carry torque at as low as 48 psi valve pressure, while some will require as high as 58 psi valve pressure to begin to carry torque. Moreover, both the valves and the clutches may change over time, due to wear and/or temperature variations. Also, it was most cumbersome and difficult to physically adjust the valve components with the engine and control system in an operating state, to achieve the desired 50 psi adjustment.

Accordingly, we have proposed an automated calibration system in which the relationship between the current to the solenoid operated valve and the point at which the associated clutch begins to carry torque is automatically determined and used to calibrate the control system. This will result in not only a relatively simple calibration procedure, but also in a much more accurate calibration, resulting in an overall smoother, more reliable shifting, particularly when the operation of two clutches is required.

SUMMARY OF THE INVENTION

The present invention provides a solenoid circuit that may be used in a transmission controller. The solenoid circuit includes a solenoid coil with a first terminal coupled to a voltage source and a second terminal coupled to a current switch. The current switch is operative and "on mode" cause current through the solenoid coil to increase over time. In addition, the current switch is operative in "off mode" to cause current through the coil to decrease over time. In this way, an average current through the coil may be established as the current switch switches between the on and off modes and the current through the coil is alternatively switched between an increasing and a decreasing state.

The arrangement of the present invention includes circuitry for measuring the instantaneous current passing through the coil at a point in time during the off state which preferably includes control circuitry that provides appropriate signals to switch the current switch to its on state, a sensing device coupled with the current switch which develops a voltage representative of the current passing through the sensing device and the current switch, and sensing circuitry which senses the developed voltage which is representative of the instantaneous current. The control circuitry switches the current switch to the off state immediately after the developed voltage has settled across the sensing circuit. In this way, control signals may be provided either to place the solenoid circuit in the on mode or the off mode to provide an appropriate average current of the solenoid circuit.

BRIEF DESCRIPTION OF THE DRAWINGS

The features of the present invention which are believed to be novel are set forth with particularity in the appended claims. The organization and manner of the operation of the invention, together with further objects and advantages thereof may best be understood by reference to the following description, taken in connection with the accompanying drawings in which like reference numerals identify like elements, and in which:

FIGS. 2A, 2B and 2C together form a schematic circuit diagram of the transmission control module of the system of FIG. 1;

FIG. 3 is a schematic circuit diagram of a display circuit which may be associated with the system of FIG. 1;

FIG. 4 is a schematic circuit diagram of a power supply circuit for the circuit of FIG. 2;

DETAILED DESCRIPTION OF THE ILLUSTRATED EMBODIMENT

Figure 1:
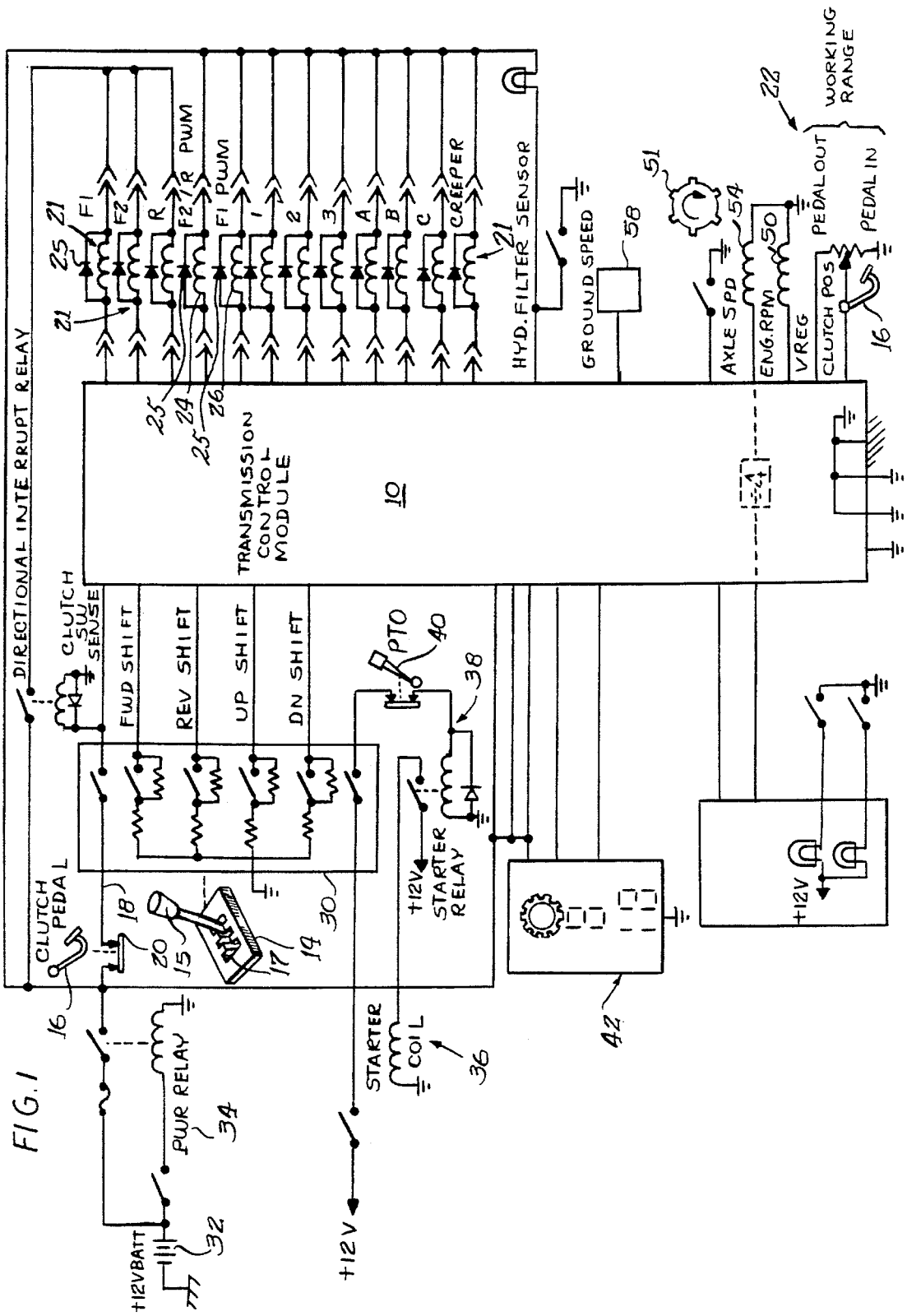
FIG. 1 is a block diagrammatic representation of a transmission control system that includes a solenoid circuit in accordance with the present invention.

Referring now to the drawings, and initially to FIG. 1, there is illustrated a transmission controller in accordance with the invention as designated generally by reference numeral 10. The transmission controller 10 (TCM) of the invention is illustrated in FIG. 1 in association with the transmission system of a relatively large vehicle, such as an agricultural tractor or the like. Generally speaking, this transmission system includes a plurality of gears which are shifted by operation of a gear shift lever 14 which in turn controls the sequence of operation of one or more clutches.

A clutch or "inching" pedal 16 is illustrated twice in FIG. 1, first in connection with a clutch switch sensing line 18 which is coupled to a suitable switch component 20 ("clutch pedal switch") for detecting when the pedal is in each of an undepressed and a depressed condition. A second clutch sensing arrangement 22 comprises a potentiometer for determining the relative position of the clutch pedal between a fully in, or disengaged, (PEDAL IN) and a fully out or engaged (PEDAL OUT) position; that is, the "working range" of the pedal. This pedal 16 has no mechanical connection to the transmission. Rather, the TCM operates the transmission as will be described hereinbelow, in response to the various inputs, including the sensors 20, 22 associated with pedal 16.

One or more solenoid-actuated, valve-operated clutches are provided in the vehicle with which the transmission controller is advantageously utilized in accordance with this invention. Accordingly, the control system also includes one or more solenoid-actuated valves ("solenoid valves"), which are indicated diagrammatically in FIG. 1 by their associated solenoid coils 21. Preferably the solenoids 24, 26 (PWM) operate the proportional valves. As will be discussed hereinbelow, these proportional valves are the ones utilized for those operations in which controlled clutch slippage is desired.

The gear shift assembly 14 is preferably of the type illustrated and described in co-pending application Ser. No. 241,027, filed Sept. 2, 1988, now U.S. Pat. No. 4,926,172; which is commonly owned with this application. Accordingly, a shift pattern is reproduced electrically in the form of a switching circuit generally designated by reference numeral 30. The just-referenced co-pending application described the operation of this circuit and of the corresponding mechanical components of the shifter 14 in further detail and is hereby incorporated by reference. Suffice it to say that respective switching lines for forward, reverse and so-called up-and-down shifting form a digital logical representation which the transmission controller can readily interpret to determine the position of a joystick-type control member in a shift pattern 17 of the gear shift mechanism which, in the illustrated embodiment, has nine possible positions. Of course fewer or more such positions, or an alternate form of shift pattern, might be utilized without departing from the invention.

Other elements of the transmission and related tractor systems and components illustrated in FIG. 1 include a twelve-volt battery 32 and an associated power relay circuit 34, and a starter system including a starter solenoid coil 36 and an associated starter relay arrangement 38. A power take-off lever 40 is also illustrated diagrammatically in FIG. 1. The transmission controller has an associated display panel 42 also diagrammatically illustrated in FIG. 3.

Details of the transmission controller 10 are illustrated in FIG. 2, to which reference is next invited. It will be noted that in the schematic illustration of FIG. 2, certain of the circuit configurations have been repeated in the Figure, whereby those circuits identical in form with circuit configurations immediately thereabove have been illustrated as boxes and connected by dashed line to indicate that the contents of these boxes are circuits identical with the circuit illustrated immediately thereabove.

In connection with the invention, a number of condition sensors or sensor means are provided, which are diagrammatically illustrated in FIG. 1. An appropriate sensor is provided for developing electrical signals corresponding to engine rpm, as diagrammatically illustrated at reference numeral 50. Similarly, an appropriate axle is monitored by an axle sensor diagrammatically indicated at 54. The sensors 50 and 54 may be reluctance sensors which respond to rotation of a gear-like member attached to the axle or other rotating part to be monitored, such as the member 51 diagrammatically shown in FIG. 1. Ground speed of the vehicle is sensed by a suitable velocity sensor which is diagrammatically illustrated at reference numeral 58.

Figure 2A:
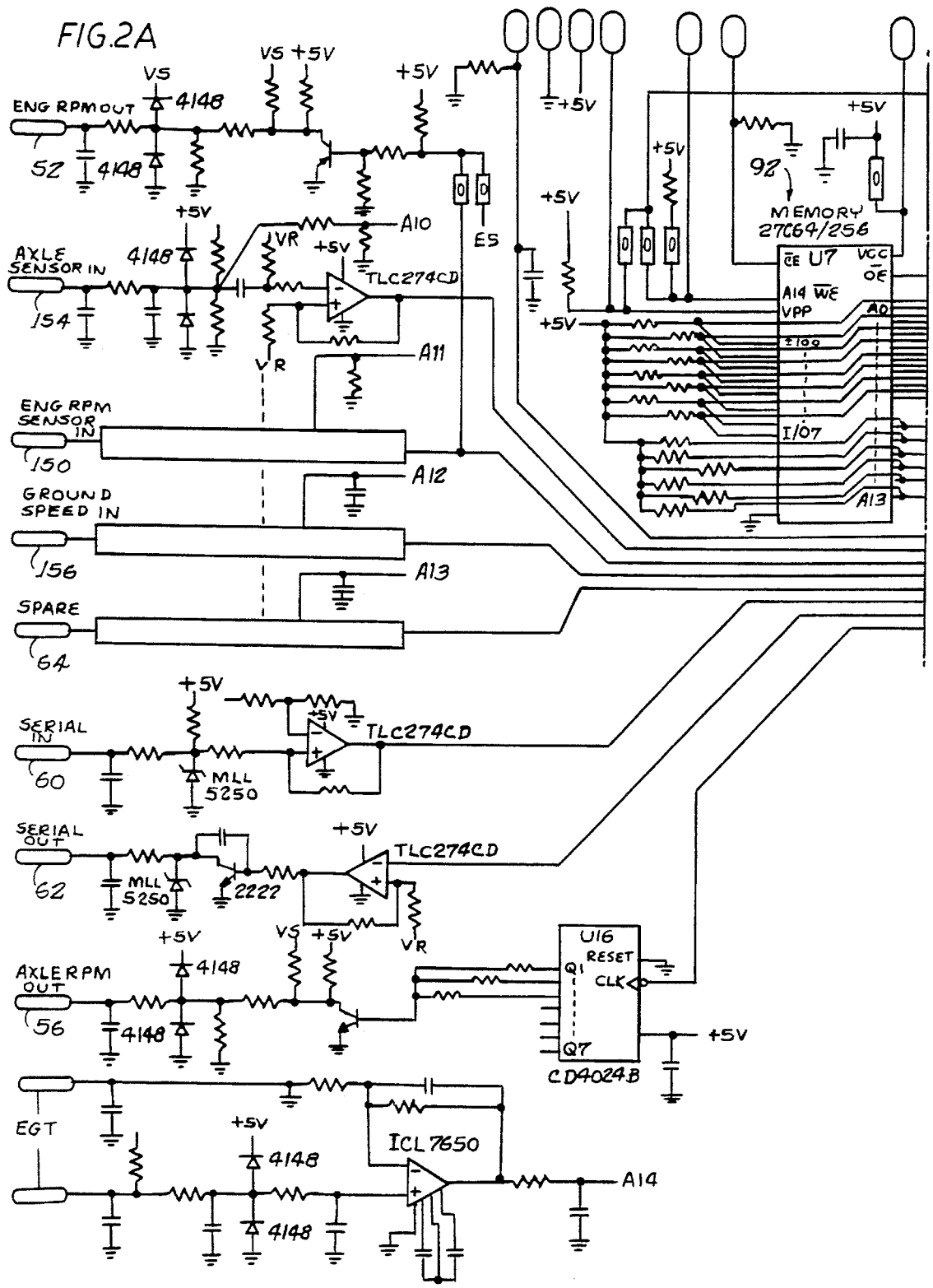

FIG. 2A shows corresponding inputs 150, 154 and 158 for sensors 50, 54 and 58. Corresponding engine rpm and axle rpm outputs 52, 56 are also provided for tying to other instrumentation if desired. Additional serial data input and output ports are provided at reference numerals 60 and 62 and a spare input is provided at reference numeral 64.

Referring briefly to FIG. 2C, a plurality of outputs are provided as indicated generally at reference numeral 64. These include outputs for pulse width modulating (PWM) the current through the respective solenoids 24, 26 for controlling the solenoid-actuated proportional valve-operated clutches. These are indicated at reference numerals 124 and 126 (F1-PWM and F2-PWM). The remaining outputs 64 drive the other solenoids 21, which do not actuate proportional valves. A plurality of additional inputs indicated generally at reference numeral 72, also in FIG. 2C, include respective plus (+) and minus (−), and forward and reverse sensors 66, 68, 74, 76, the clutch position sensor 22, and the clutch pedal sensor 20. Suitable transmission, oil pressure and temperature sensors 78, 80 are provided as well as a hydraulic filter sensor 82.

FIG. 2C (taken in conjunction with FIGS. 1 and 2B) also shows circuitry for pulse width modulating the current through solenoid coils 24, 26. Inasmuch as solenoid coil 24 is coupled with the drain terminal of a Field Effect Transistor (FET) 102 at output 124, selective switching of the FET 102 permits selective conduction of the solenoid current through a resistor 104. The gate terminal of FET 102 receives gating signals supplied by the microprocessor 90 at a first high speed output HS00 (see FIG. 2B) via appropriate buffer circuitry as will be understood by those skilled in the art. FIG. 2C also illustrates the source terminal of FET 102 connected with a resistor 104. The voltage developed across resistor 104 is also provided through a resistor 110 to an analog-to-digital input AD4 of the processor 90 (see FIG. 2B). This signal is indicative of the sensed current through the solenoid coil 24. As explained below in conjunction with FIGS. 5–8, the processor 90 supplies appropriate gating signals to the FET 102 upon comparing the sensed current with a preselected value.

Likewise, the same pulse width modulating circuitry is provided for solenoid 26. A FET 112 is selectively switched to permit selective conduction of the solenoid current through resistor 114. The gate terminal of FET 112 receives gating signals supplied by the microprocessor 90 at a second high speed output HS01 (see FIG. 2B) via appropriate buffer circuitry. The voltage developed across resistor 114 is indicative of the sensed current through solenoid coil 26 and is provided through resistor 116 to an analog-to-digital input AD5 of the processor 90 (see FIG. 2B).

While a great number of control features can be and preferably are provided in connection with the illustrated transmission controller, the present invention is concerned primarily with calibration information corresponding to the current level at which the solenoid-actuated proportional valve-operated clutches begin (or cease) to carry torque during both engagement and disengagement thereof. This information is important in providing a reliable and repeatable control signal to the solenoids for the proportional valve-operated clutches to assure smooth operation thereof during shifting of gears of the associated tractor or other vehicle. Such smooth shifting is especially crucial in instances wherein it is necessary to shift between two gears which require the activation and deactivation of multiple clutches. That is, it is important that the point at which one clutch ceases carrying torque and the next begins to carry torque are carefully synchronized to assure a smooth shifting operation.

Figure 2B:
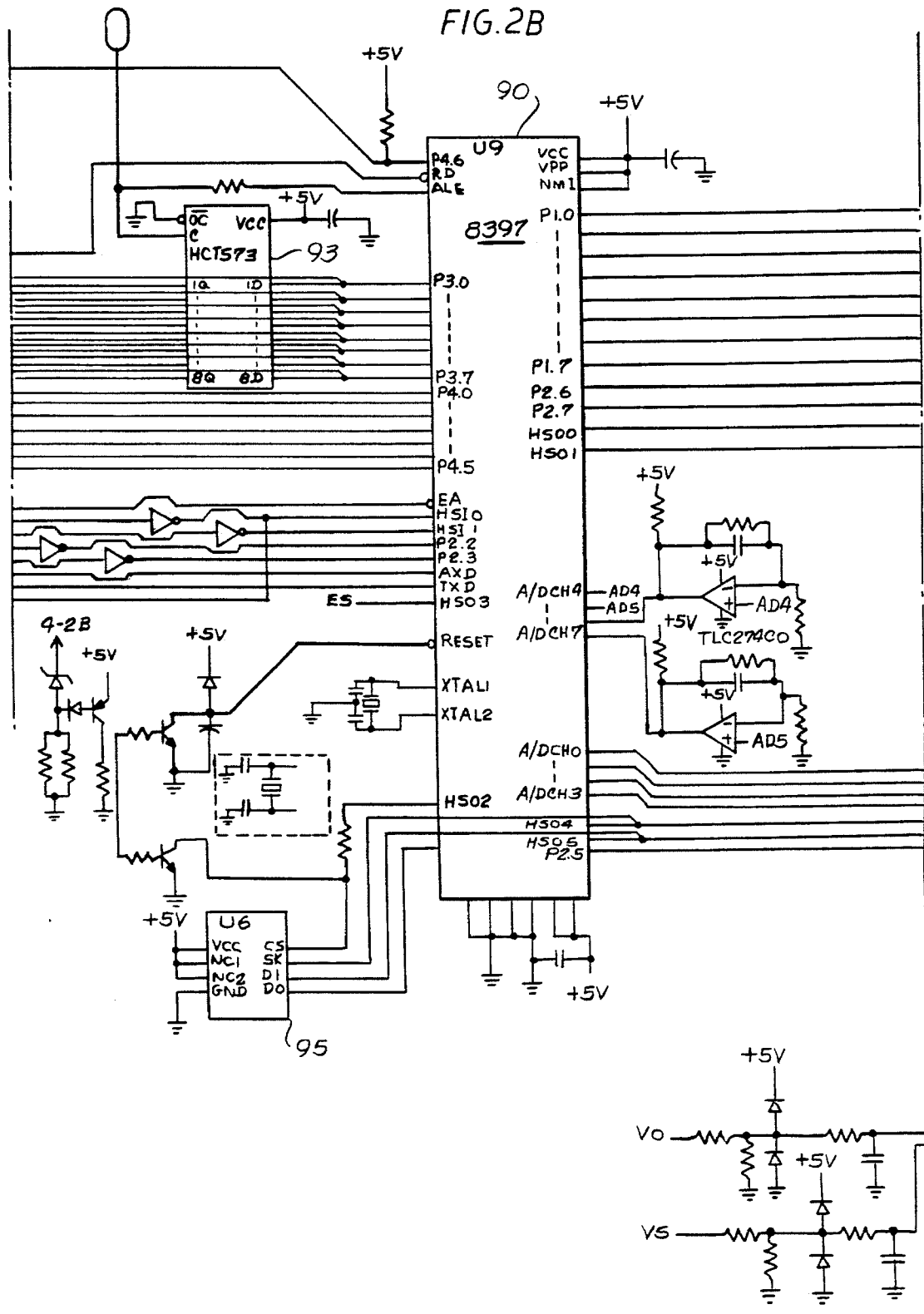

Accordingly, and as best viewed in FIG. 2B, The controller 10 includes a microcomputer or microprocessor 90, preferably of the type generally designated 8397. The microcomputer 90 has a plurality of input and output ports which are coupled with the inputs and outputs previously mentioned by way of suitable intervening circuits. The microprocessor also includes current monitoring means which produces a current signal corresponding to the current flow to each of the solenoid valves 21. Precise current measurement is provided for the solenoids 24, 26. A suitable vehicle monitoring means or sensor, such as the velocity sensor 58 and/or axle speed sensor 54, or the engine rpm sensor 50, forms a monitoring means for producing a predetermined threshold signal corresponding to the point at which each clutch associated with a proportional valve begins to carry a predetermined amount of torque.

The microcomputer 90 may have suitable on-board memory, and additional outboard memory may be provided in the form of memory components 92, 93 and 95 as indicated in FIGS. 2A and 2B. Together, these memory elements form memory means for retaining predetermined information, including information corresponding to the abovementioned current and velocity or engine speed signals. Preferably, the calibration information is stored in nonvolatile memory device 95. The microcomputer 90 includes correlating means responsive to the above-mentioned threshold signal which comprises a predetermined threshold value of the velocity or engine speed signal, which threshold value corresponds either to a predetermined minimum velocity of the vehicle or to a predetermined drop in engine speed indicating engine loading, for causing the nonvolatile memory 95 to retain calibration information. This retained calibration information includes information corresponding to the current signal produced when this predetermined threshold value is reached. Accordingly, the retained information corresponds to a threshold value of the current to each of the solenoids which actuate proportional valves, at which a corresponding clutch engages or begins to carry a predetermined amount of torque, so as to begin the movement of the vehicle at the predetermined minimal velocity and/or cause measurable engine loading, in the corresponding selected gear.

The memory means further retains appropriate gear identity and solenoid identity information corresponding to each gear and to the corresponding solenoid for the proportional valve which operates the clutch associated with each gear. The correlating means is further capable of correlating this gear and solenoid identity information with calibration information, such that a suitable calibrated current value unique to each proportional valve/clutch combination can be retained. That is, a given proportional valve may be used to operate each of a plurality of clutches, and the calibration data will of course be different for each and will be separately determined and generated by the foregoing procedure.

Moreover, it will be seen that this information may be recalibrated at any time, if desired, in order to take into account variations in the mechanical and electrical characteristics of the equipment over a period of time, due to either wear, changes In temperature during operation, or other factors. Accordingly, the calibration may be repeated whenever necessary or desirable to assure continued smooth operation of gears during those shifting and other operations requiring controlled clutch slippage.

The microprocessor further includes suitable control means which is responsive to the foregoing calibration information retained in the memory for thereafter applying an appropriate current based on the corresponding calibrated or threshold current to the solenoid for each of the clutches controlled by a proportional valve during any shifting between gears which require the controlled slippage of one or more clutches. Moreover, the predetermined threshold value (e.g., vehicle speed or engine speed drop) is chosen, and the calibration operation above described is also carried out by the microcomputer, in such a manner that the proportional valves are always operated in a substantially linear portion of a current-to-pressure characteristic curve thereof while controlling clutch slippage.

In addition to the foregoing calibration features, the transmission controller of the invention has a number of other features. Briefly, these features may be summarized or characterized as follows:
1) Speed matching;
2) Auto shuttle shift;
3) Auto feathering of clutches;
4) Programmable shuttle shift.

Speed matching generally comes into play when the clutch pedal (commonly referred to as the inching pedal) is depressed as the shift lever is moved to neutral allowing the tractor to "free-wheel" and the tractor loses or gains speed depending on the load or incline. When the inching pedal is released or the shift lever returned to forward, a conventional transmission will cause the engine rpm and ground speed to reestablish a fixed relationship, which will be different from their relationship during so-called free-wheeling, but the same as the ratio which prevailed prior to the use of the clutch or inching pedal. If, for example, the tractor is going downhill and has gained speed, the engine rpm will increase when the inching pedal is released and the vehicle will tend to slow down. The abruptness of the slow-down would depend upon the operator control, or so-called feathering of the inching pedal. This is an operation which requires considerable skill and experience on the part of the operator.

In accordance with the present invention, the control 10 includes means for sensing the engagement and/or disengagement of the clutch or inching pedal. When reengagement is sensed, following a disengagement, the controller automatically selects the gear which most closely matches the engine rpm and ground speed which is also detected at that point (i.e., upon reengagement of the inching pedal). This will in turn provide for a relatively smooth clutch engagement, without requiring a feathering operation of the clutch.

The process commonly referred to as shuttling, is the process of quickly moving or shifting between forward and reverse gears. Such rapid shifting is often required in operation of equipment such as loaders. In the controller, according to the present invention, the operator may abruptly move the gear shift from a forward to a reverse gear or vice versa. The controller responds by modulating the current to the solenoid for the proportional valve, and hence the resultant pressure on the clutches to provide for a smooth change in direction of the vehicle. This is done by using the same information stored during the abovementioned calibration procedure; i.e., by determining the point at which the respective gears begin to carry load and/or cease carrying a load, so as to provide for smooth shifting therebetween by modulating the current to the solenoids for the proportional valves which operate the gears accordingly.

Moreover, the controller also permits the operator to preselect and store in memory a given forward and reverse gear, and the controller is programmable to thereafter establish smooth shifting between the preselected gears on command.

The programmable shuttle shift feature also allows the operator to preselect some bias between a reverse gear and a forward gear; i.e., the preselected reverse gear may be the same gear as the forward gear (0 bias) or as much as three gears below or above the preselected forward gear (−3 to and including +biases, respectively). As a further option, the controller permits the operator to select the preselected reverse gear as the low gear regardless of the selected forward gear.

The auto leathering of clutch feature is similar to the clutch featbering operation previously done by the operator as mentioned above with respect to speed matching. In the present invention, the controller will allow movement of the tractor from a standstill without using the inching pedal at all. The gear selector can be moved abruptly into a forward or reverse gear without operating the clutch pedal. The controller will gradually modulate or control the current to the solenoid for the appropriate proportional valve so as to assure a smooth start-up of the vehicle. It will be appreciated that this will also involve the previously calibrated threshold current for selecting an appropriate starting current to the solenoid for the proportional valve for smoothly engaging the clutch associated with the desired forward or reverse gear. This auto feathering feature relieves the operator of the necessity of using the inching pedal except in operations where a controlled small incremental movement of the tractor or other vehicle (commonly referred to as inching) are required for some purpose.

In operation, the above-described calibration procedure is preferably carried out essentially as follows:

Initially the operator enters the calibration mode of the controller and then moves the joystick controller into the position corresponding to a gear operated by the clutch of a proportional valve/clutch combination to be calibrated. The joystick must be held in this position during the entire calibration procedure. The display unit (see also FIG. 3) will give a suitable visual indication of the psi pressure (calculated on the basis of current) on the clutch during this operation. The controller leaves the pressure at a preselected minimum value for on the order of three seconds. If tractor movement or engine speed drop is detected during this time, depending on which calibration technique is employed, the controller shuts off and gives an error indication on the display. This indicates that the associated valve should be replaced or readjusted.

In the event the error indication does not take place, the controller begins stepping up the pressure at small increments, preferably on the order of 1 psi every one second. When movement at the predetermined minimum velocity or the predetermined engine speed drop is detected, the controller stores the corresponding current at that time as the calibration or threshold current. The process may be repeated for calibration of either the same or a different proportional valve/clutch combination by appropriate movement of the joystick to its neutral or center position and then to a position appropriate to another proportional valve/clutch combination to be calibrated.

In the event no movement or engine speed drop is detected during the foregoing operation after a certain number of increments of increase of pressure to a predetermined maximum, this also indicates an error state, and an appropriate error indication is given and all of the valves and solenoids are shut down. In the illustrated embodiment, this predetermined maximum pressure corresponds to substantially 70 psi.

In order to fully disclose a preferred embodiment of the foregoing calibration procedure, a copy of a suitable program listing for the microprocessor for carrying out the foregoing calibration procedure, is produced on the following pages.

Referring now to FIGS. 5–8, current is controlled in each of the proportional valve PWM coils 24, 26 by turning on a corresponding drive FET (Field Effect Transistor) 102 for a given time period and then leaving the FET off for an appropriate time period. When the FET is off, the inductance of the solenoid attempts to maintain the coil current by using a diode 25 across the coil. Due to resistance of this path as well as the voltage drop across the diode, the coil current falls in time. The challenge is to determine the "on" time and the "off" time of the FET to maintain a desired average current through the solenoid coil.

Figure 6:
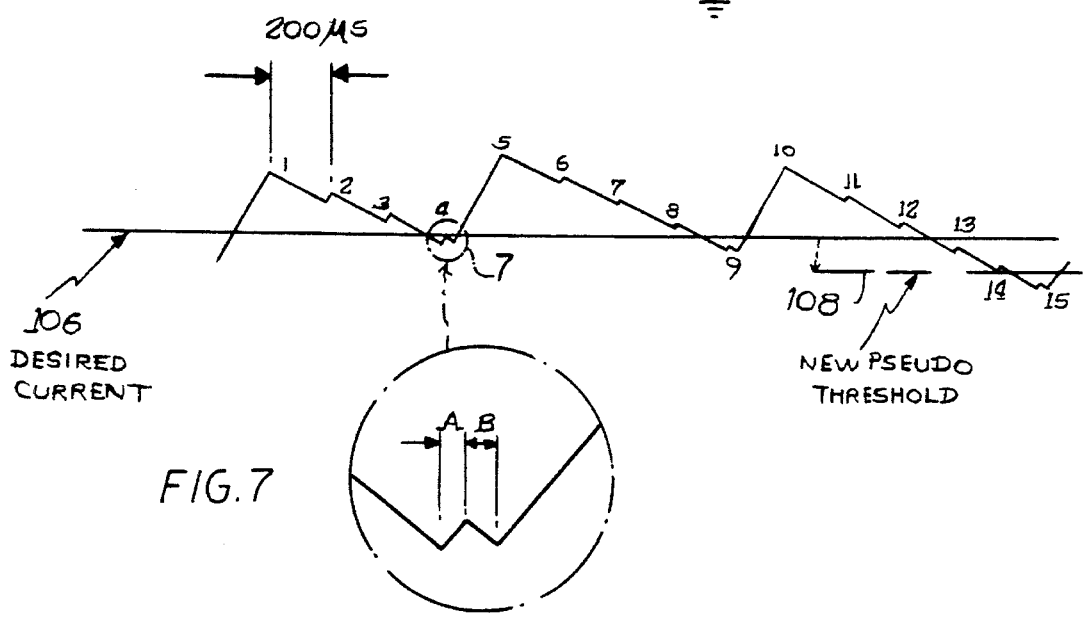
FIGS. 6, 7 and 8 are waveform diagrams illustrating the operation of the circuit of FIG. 5.

FIG. 6 illustrates a control scheme used to maintain a desired average current through the PWM solenoids. The FET 102 is initially shown turned on for approximately 200 us. The current across the sense resistor "R" 104 at point "1" is read and stored in memory. The current at "1" (see FIG. 6) in this example is above the desired current (line 106); thus the FET is turned off for 200 us. After leaving the FET off for 200 us, the controller needs to know the current. To determine the present coil current, the controller turns on the FET for as short a time period as possible and still allow for settling of the sensed voltage across "R". The routine turns the FET off to allow for the A/D conversion and the time required for the current to be compared to the desired current. If the read current is above the desired current as at "2" the FET is allowed to remain off for approximately 200 us. If the read current is below the desired current as at "4", the FET is turned on for approximately 200 us.

Figure 7:
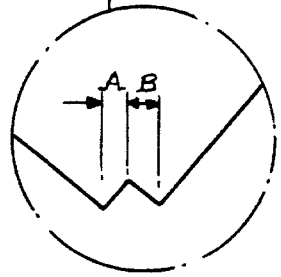
Figure 8:
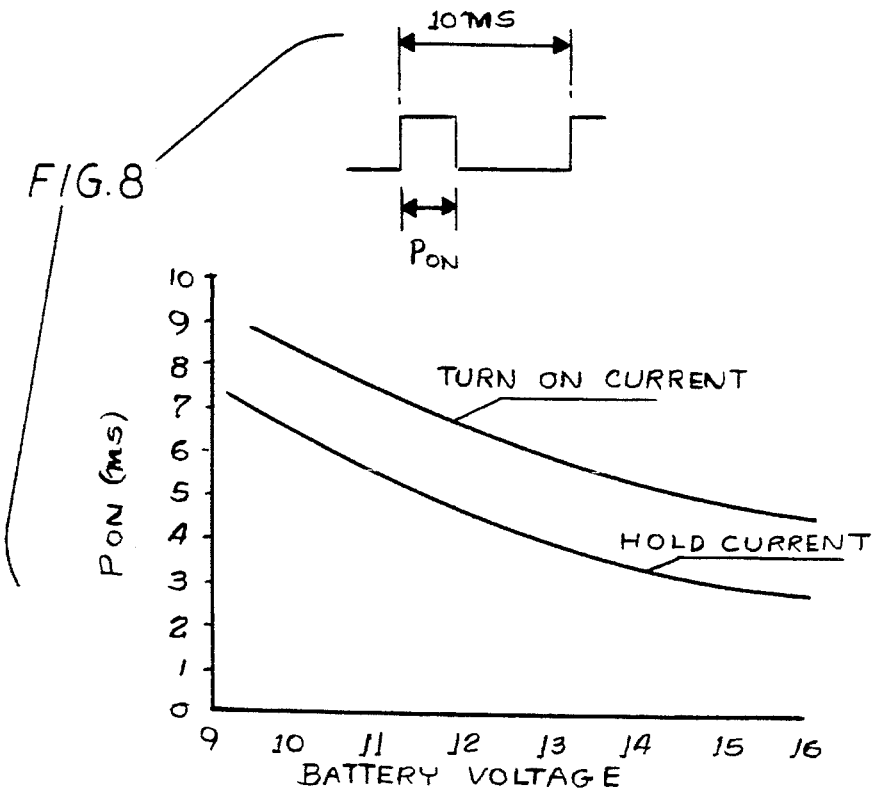

The settling time allotted for the sense voltage read across "R" is shown in FIG. 7 as time "A". This is typically 13–14 us. The short time interval required for the A/D conversion and the processor to compare the read current with the desired current is shown as time "B". This is typically 30 us.

At each numbered location in FIG. 6 (1,2,3, etc.), the processor reads and stores the coil current in memory. These values are averaged and compared periodically with the desired current. If a small error exists, a new "pseudo current" 108 is calculated which is then used as the threshold instead of the desired current. This "pseudo current" is continually adjusted to insure that the averaged currents at the numbered locations in FIG. 1 equals the desired current.

Typically the "pseudo current" will be slightly different than the desired current due to di/dt being different when charging than discharging. This "pseudo current" allows fine tuning of the system giving very precise PWM current control.

This current control is fairly immune to changes in supply voltage and to changes in temperature that affect the coil resistance and diode voltage.

Figure 5:
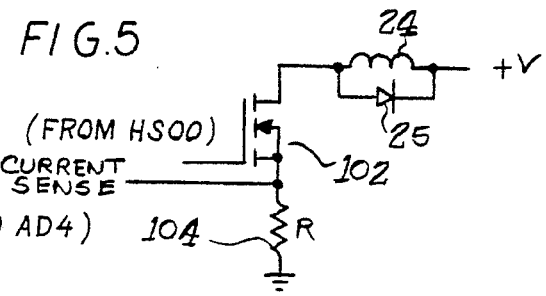
FIG. 5 is a circuit diagram of a current control circuit useful with the system of FIG. 1.

The other "direct acting" solenoids (collectively indicated by reference numeral 21 in FIG. 1) require a less precise current control scheme than the PWMs, since they do not actuate proportional valves. These solenoid coils are either energized or not energized. However, they are six volt coils and thus require some sort of pulse width modulation to control power consumption when driven with FETs as shown in FIG. 5.

The control scheme used pulses the coils 29 at a rate of 100 Hz. The on time of the pulse is varied as a function of supply voltage. No attempt is made to compensate for temperature variation other than choosing a $P_{on}$ vs. voltage function that works over the entire range of temperature encountered. This requires adequate current at high temperatures but not excessive current at cold temperatures.

Two functions (see FIG. 8) are used to determine $P_{on}$ given $V_{battery}$. One is used initially for a short time duration to turn the solenoid coil on. This function provides relatively high current to insure fast response from the solenoid. A second function then takes over that lowers the current to a level that will not cause over-heating when the solenoid is held on for an extended time period but still guarantees the solenoid will not drop out.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. In a solenoid circuit having a solenoid coil with a first terminal coupled to a source of voltage and a second terminal coupled to a current switch operative in a first on mode to cause the current through said coil to increase over time and in a second off mode to cause the current through said coil to decrease over time so that an average current through said coil is established as said switch switches between said modes and the current through said coil is alternately switched between an increasing state and a decreasing state, an apparatus for measuring the instantaneous current passing through said coil at a point in time during said decreasing state comprising:

means for switching said current switch to said first on mode;

means coupled to said current switch for developing a voltage representative of the current passing through said current switch;

means for sensing said developed voltage; and means for switching said current switch to said second off mode immediately upon settling of said developed voltage, said sensed settle developed voltage representative of said instantaneous current.

2. An apparatus for maintaining a desired average current through a solenoid coil in a circuit having switching means alternately switching on and off thereby respectively causing current through said solenoid coil to alternatively increase and decrease, said apparatus comprising:

means for switching on said switching means for a predetermined first time interval, the current through said solenoid coil increasing during said first time interval;

means for switching off said switching means for a predetermined second time interval, the current through said solenoid coil decreasing during said second time interval;

means for sensing the current through said solenoid coil upon expiration of said second time interval by switching on said switching means only for a time period sufficient to permit said sensing and then switching off said switching means;

means for permitting another second time interval to elapse if the magnitude of said sensed current is greater than a predetermined threshold; and means for again switching on said switching means for another first time interval if the magnitude of said sensed current is less than said predetermined threshold.

3. The apparatus of claim 2 further comprising:

means for determining an average value of the magnitudes of the current sensed upon expiration of each of said second time intervals; and means for adjusting said predetermined threshold to cause said average value to approach said desired average current.

4. A method for maintaining a predetermined average current through a solenoid coil in a circuit having switching means alternately switching on and off for respectively causing current through said solenoid coil to alternately increase and decrease, said method comprising:

switching on said switching means for a predetermined first time interval;

switching off said switching means for a predetermined second time interval;

comparing the magnitude of the current through said solenoid coil upon expiration of said second time interval to a predetermined threshold;

if in response to said comparing step said magnitude is greater than said predetermined threshold, permitting another second time interval to elapse and then repeating said comparing step; and if in response to said comparing step said magnitude is less than said predetermined threshold, repeating said switching on, said switching off and said comparing steps.

5. In a solenoid circuit having a solenoid coil with a first terminal coupled to a source of voltage and a second terminal coupled to a current switch operative in a first on mode to cause the current through said coil to increase over time and in a second off mode to cause the current through said coil to decrease over time so that an average current through said coil is established as said switch switches between said modes and the current through said coil is alternately switched between an increasing state and a decreasing state, an apparatus for measuring the instantaneous current passing through said coil at a point in time during said decreasing state comprising:

means for switching said current switch to said first on mode;

means coupled to said current switch for developing a voltage representative of the current passing through said current switch; and control means for sensing said developed voltage and for switching said current switch to said second off mode immediately upon settling of said developed voltage, said sensed settled developed voltage representative of said instantaneous current.

\* \* \* \* \*